United States Patent
Warrick et al.

(10) Patent No.: US 9,746,012 B2
(45) Date of Patent: Aug. 29, 2017

(54) SELF-CENTERING VIAL CLAMP

(71) Applicant: Hach Company, Loveland, CO (US)

(72) Inventors: Bret Warrick, Bellingham, WA (US);
Keith Bender, Grants Pass, OR (US)

(73) Assignee: Hach Company, Loveland, CO (US)

( * ) Notice: Subject to any disclaimer, the term of this patent is extended or adjusted under 35 U.S.C. 154(b) by 0 days.

(21) Appl. No.: 14/044,587

(22) Filed: Oct. 2, 2013

(65) Prior Publication Data

US 2014/0026388 A1    Jan. 30, 2014

Related U.S. Application Data

(62) Division of application No. 13/081,735, filed on Apr. 7, 2011, now Pat. No. 8,550,413.

(60) Provisional application No. 61/329,174, filed on Apr. 29, 2010.

(51) Int. Cl.
| | |
|---|---|
| F16B 2/02 | (2006.01) |
| B25B 5/00 | (2006.01) |
| B25B 5/06 | (2006.01) |
| F16B 2/12 | (2006.01) |
| A61J 1/16 | (2006.01) |
| B01L 9/00 | (2006.01) |
| A47J 45/10 | (2006.01) |

(Continued)

(52) U.S. Cl.
CPC ........ *F16B 2/12* (2013.01); *A61J 1/16* (2013.01); *B01L 9/50* (2013.01); *A47J 45/10* (2013.01); *B01L 2200/023* (2013.01); *B25B 5/02* (2013.01); *B25B 5/04* (2013.01); *Y10T 29/49826* (2015.01)

(58) Field of Classification Search
CPC ...... A61J 1/16; F16B 2/12; B01L 9/50; B01L 2200/023; A47J 45/00; A47J 45/10; B67B 7/00; B67B 6/00; B25B 5/02; B25B 5/04; B25B 5/163
USPC ... 248/229.12, 229.22, 230.3, 231.41, 316.4, 248/310, 316.5, 519, 523, 313, 230.4; 269/225, 227, 231, 234, 237, 295, 268, 269/126, 127, 128; 294/16, 92, 116, 137; 81/3.25, 3.31, 3.32, 300; 29/428
See application file for complete search history.

(56) References Cited

U.S. PATENT DOCUMENTS

| | | | | |
|---|---|---|---|---|
| 848,850 | A | * | 4/1907 | Pissahl .......................... 248/524 |
| 1,408,184 | A | * | 2/1922 | Farlow .......................... 81/3.32 |
| 1,912,500 | A | * | 6/1933 | Rutledge ........................ 81/3.32 |

(Continued)

FOREIGN PATENT DOCUMENTS

SU       1301373 A  *  4/1987

*Primary Examiner* — Tan Le
(74) *Attorney, Agent, or Firm* — Ference & Associates LLC

(57) ABSTRACT

A self-centering vial clamp is provided. The self-centering vial clamp includes a clamp body including a vial aperture and two or more jaw slots spaced around the vial aperture, two or more clamp jaws spaced around the vial aperture, with a clamp jaw including a vial contact face and one or more jaw projections configured to engage a jaw slot of the clamp body, and two or more lever arms coupled to the two or more clamp jaws. A lever arm of the self-centering vial claim is configured to be manually pivoted, wherein the lever arm translates the pivoting motion into a sliding motion of the corresponding clamp jaw. Interacting lever gears formed on the lever arms constrain the two or more clamp jaws to move substantially in unison during the manual pivoting, aligning the vial.

8 Claims, 7 Drawing Sheets

(51) Int. Cl.
*B25B 5/02* (2006.01)
*B25B 5/04* (2006.01)

(56) References Cited

U.S. PATENT DOCUMENTS

| | | | | |
|---|---|---|---|---|
| 2,087,827 | A * | 7/1937 | Westlund | A47J 45/10 81/3.32 |
| 2,881,645 | A * | 4/1959 | Kruchten | B25B 1/10 269/181 |
| 3,425,732 | A * | 2/1969 | Reich | 294/16 |
| 3,545,804 | A * | 12/1970 | Richner | 294/116 |
| 3,837,633 | A * | 9/1974 | Paulsen | 269/128 |
| 4,515,195 | A * | 5/1985 | Gladstein | 248/519 |
| 4,671,477 | A * | 6/1987 | Cullen | 248/122.1 |
| 4,716,811 | A * | 1/1988 | Johnson | 269/237 |
| 5,307,565 | A * | 5/1994 | Erbrick et al. | 30/251 |
| 6,182,534 | B1 * | 2/2001 | Hardman | B67B 7/182 81/3.2 |
| 6,711,789 | B2 * | 3/2004 | Ping | 24/505 |
| 8,011,426 | B1 * | 9/2011 | Orgeron | 166/85.1 |
| 8,550,413 | B2 * | 10/2013 | Warrick et al. | 248/229.22 |
| 2003/0098402 | A1 * | 5/2003 | Kaupp | 248/311.2 |

* cited by examiner

SELF-CENTERING VIAL CLAMP

CROSS-REFERENCE TO RELATED APPLICATIONS

This application is a divisional application of co-pending U.S. patent application Ser. No. 13/081,735, filed on Apr. 4, 2011, entitled "SELF-CENTERING VIAL CLAMP", which in turn is a non-provisional of U.S. Provisional Patent Application No. 61/329,174; the contents of each prior application are incorporated by reference herein.

FIELD

The invention is related to the field of a vial clamp, and more particularly, to a self-centering vial clamp.

BACKGROUND

There are many processes that involve the use and handling of vials of materials. For example, vials may be used to store, transport, and/or test a variety of materials in industrial, scientific, and medical processes, to give a few examples. The vials can be of varying sizes, shapes, and capacities. The vials can be formed of any material, but vials are often made from glass due to the relatively inexpensive cost of glass and due to the chemical unreactiveness of glass. The main drawback is that glass is easily damaged or broken.

In the prior art, vial handling can be automated or manual in nature. Automated handling may work well for processing and handling large and continuing streams of vials, but is typically not needed or economical for non mass-production situations. In a processing situation, one or more vials may be manually inserted into a measurement or testing apparatus (or other vial handling or processing device). In order to minimize processing time and maximize efficiency, it is desirable to reduce the energy, time, and effort needed to properly place and hold a vial. Makers of equipment that handle and hold vials desire to minimize the need for a user to manipulate racks, holders, clamps, and so forth, as significant vial handling requirements will increase the overall processing cost and time. Further, vial handling requirements may detract from the user's ability to devote full attention to the measurements or tests to be performed.

The prior art has other drawbacks. Improper placement and/or alignment of a vial may negatively affect the test, such as where material to be added to a vial is dispensed outside of the vial or is otherwise spilled or wasted Improper placement and/or alignment of a vial may damage the vial, such as where a probe is to be inserted into the vial as part of a process. Where the vial is glass or a similar breakable material, any misalignment may cause damage to or breakage of the vial. Improper placement and/or alignment of a vial can damage the associated instrument Improper placement and/or alignment of a vial can cause the vial to be tipped, resulting in spillage of expensive materials.

BRIEF SUMMARY

In some aspects of the invention, a self-centering vial clamp comprises: a clamp body including a vial aperture and two or more jaw slots spaced around the vial aperture; two or more clamp jaws spaced around the vial aperture, with a clamp jaw of the two or more clamp jaws including a vial contact face and one or more jaw projections configured to engage a jaw slot of the clamp body; two or more lever arms corresponding to and coupled to the two or more clamp jaws, with a lever arm of the two or more lever arms being configured to be manually pivoted, wherein the lever arm translates the pivoting motion into a sliding motion of the corresponding clamp jaw; and interacting lever gears formed on the lever arms, with the lever gears constraining the two or more lever arms and the two or more clamp jaws to move substantially in unison.

Preferably, the self-centering vial clamp applies a predetermined clamping force to a vial.

Preferably, the self-centering vial clamp is configured to clamp a vial of a size up to the vial aperture size.

Preferably, the two or more lever arms include grasping regions configured to be easily grasped.

Preferably, the self-centering vial clamp further comprises a biasing device configured to place a predetermined clamping force on the two or more clamp jaws.

Preferably, the self-centering vial clamp further comprises a biasing device configured to urge the two or more clamp jaws toward a normally-closed central position in relation to the vial aperture.

Preferably, the self-centering vial clamp further comprises at least one biasing device connected between the two or more lever arms.

Preferably, the self-centering vial clamp further comprises at least one biasing device connected between the two or more clamp jaws.

Preferably, the two or more jaw slots are substantially equally spaced around the vial aperture.

In some aspects of the invention, a self-centering vial clamp comprises: a clamp body including a vial aperture and two or more jaw slots that are spaced around the vial aperture; two or more clamp jaws positioned substantially on opposite sides of the vial aperture, with a clamp jaw of the two or more clamp jaws including a vial contact face and one or more jaw projections configured to engage a jaw slot of the clamp body; two or more lever arms corresponding to and coupled to the two or more clamp jaws, with a lever arm of the two or more lever arms being configured to be manually pivoted, wherein the lever arm translates the pivoting motion into a sliding motion of the corresponding clamp jaw; interacting lever gears formed on the lever arms, with the lever gears constraining the two or more lever arms and the two or more clamp jaws to move substantially in unison; and at least one biasing device configured to place a predetermined clamping force on the two or more clamp jaws and to urge the two or more clamp jaws toward a normally-closed central position in relation to the vial aperture.

Preferably, the self-centering vial clamp is configured to clamp a vial of a size up to the vial aperture size.

Preferably, the two or more lever arms include grasping regions configured to be easily grasped.

Preferably, the self-centering vial clamp further comprises at least one biasing device connected between the two or more lever arms.

Preferably, the self-centering vial clamp further comprises at least one biasing device connected between the two or more clamp jaws.

Preferably, the two or more jaw slots are substantially equally spaced around the vial aperture.

In some aspects of the invention, a method of clamping and holding a vial with a self-centering vial clamp comprises: receiving the vial at least partially in a vial aperture of the self-centering vial clamp, where the vial is to be held relative to the vial aperture; urging together two or more clamp jaws of the self-centering vial clamp until the two or more clamp jaws contact the vial; and constraining the two or more clamp jaws to move substantially in unison, wherein the clamp jaws are urged toward a normally-closed central position with respect to the vial aperture, wherein the two or more clamp jaws self-center the vial and hold the vial with respect to the vial aperture.

Preferably, the self-centering vial clamp is configured to apply a predetermined clamping force to the vial.

Preferably, the self-centering vial clamp is configured to clamp the vial where the vial can be of a size up to the vial aperture size.

Preferably, the self-centering vial clamp further comprises at least one biasing device that places a predetermined clamping force on the two or more clamp jaws.

Preferably, the self-centering vial clamp further comprises at least one biasing device that urges the two or more clamp jaws toward a normally-closed central position in relation to the vial aperture.

BRIEF DESCRIPTION OF THE DRAWINGS

The same reference number represents the same element on all drawings. It should be understood that the drawings are not necessarily to scale.

DETAILED DESCRIPTION

FIGS. 1-7 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
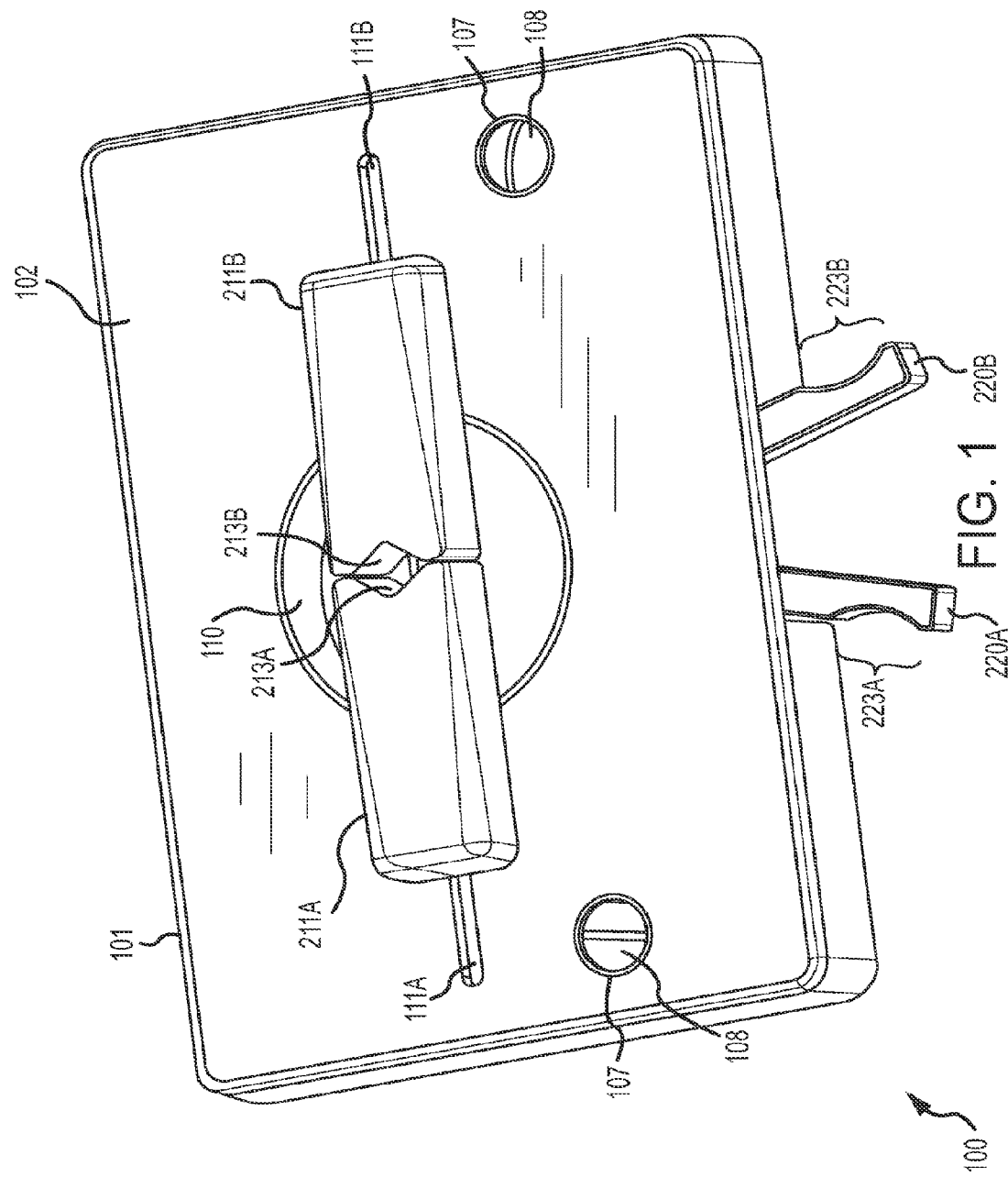
FIG. 1 shows a self-centering vial clamp according to the invention.

FIG. 1 shows a self-centering vial clamp 100 according to the invention. The self-centering vial clamp 100 is designed to clamp and hold a vial. The vial can comprise a variety of shapes and sizes. The vial can be formed of any material. The self-centering vial clamp 100 can clamp and hold a vial to be used in various tests or procedures. The self-centering vial clamp 100 can clamp and hold a vial relative to an instrument or other structures. The self-centering vial clamp 100 applies a predetermined clamping force to a vial. The predetermined clamping force should be understood to include a predetermined clamping force range, as the clamping force may be substantially constant or may vary somewhat over the jaw opening distance. The predetermined clamping force range may depend on the design of the self-centering vial clamp 100, such as the characteristics of the biasing device 242, the jaw opening distance, and the design of the lever arms 220 (discussed below). For example, the biasing device 242 may generate a larger biasing force as the jaws are opened, but the design of the lever arms 220 may offset this larger biasing device force, such as due to a change in angular displacement of the lever arms 220. The self-centering vial clamp 100 holds a vial in a self-centered manner, where a user does not have to position or adjust the clamp; or the vial. The self-centering vial clamp 100 is designed for intuitive and easy operation.

The self-centering vial clamp 100 includes a clamp body 101, a vial aperture 110, and two or more jaw slots 111. The clamp body 101 can be substantially rectangular in shape, as shown, or can be formed in any other suitable shape and size. The clamp body 101 can include a substantially regular or planar top surface 102.

The vial aperture 110 can be of a predetermined size and a predetermined shape. A vial to be clamped can extend at least partially into the vial aperture 110, or can extend completely through the vial aperture 110, if desired. Significant portions of a vial may extend above and/or below the self-centering vial clamp 100, wherein the vial can be used in tests, measurements, or various other procedures or uses. It should be understood that the self-centering vial clamp 100 can be designed to accommodate vials of a size up to the vial aperture size.

The two or more jaw slots 111 are formed in the clamp body 101 and are spaced around the vial aperture 110. The two or more jaw slots 111 may be substantially equally spaced around the vial aperture 110. The two or more jaw slots 111 may be substantially equidistantly spaced around the vial aperture 110. The two or more jaw slots 111 may be substantially equally and oppositely spaced around the vial aperture 110. For example, in the embodiment shown, the two jaw slots 111A and 111B are substantially opposite each other across the vial aperture 110. The jaw slots 111 are of a predetermined length that accommodates the size of the vial aperture 110 and allows each clamp jaw 211 to move over substantially a complete radius distance of the vial aperture 110.

The self-centering vial clamp 100 further includes two or more clamp jaws 211 configured to move substantially reciprocally with respect to the clamp body 101. The two or more clamp jaws 211 engage the two or more jaw slots 111, wherein the two or more jaw slots 111 guide and constrain the reciprocal motion of the two or more clamp jaws 211.

Each clamp jaw 211 includes a vial contact face 213 that contacts a vial to be clamped. When no vial is in the self-centering vial clamp 100, the vial contact faces 213 of the clamp jaws 211 will be substantially at the center of the vial aperture 110, as shown.

A vial contact face 213 in some embodiments can be shaped to optimally contact a vial. A vial contact face 213 in some embodiments can be textured or include a surface that increases a contact area and/or a contact friction with a vial. A vial contact face 213 in some embodiments can be over-molded with a pliable or resilient material in order to increase a contact area and/or a contact friction with a vial.

The self-centering vial clamp 100 further includes two or more lever arms 220. A lever arm 220 of the two or more lever arms 220 is configured to be manually pivoted, wherein the lever arm translates the pivoting motion into a sliding motion of the corresponding clamp jaw 211. Although the embodiment shown includes only two clamp jaws 211 and two lever arms 220, it should be understood that more than two could be used. For example, in some embodiments the self-centering vial clamp 100 could be constructed with three or four clamp jaws and three or four corresponding lever arms.

Grasping regions 223 may be formed on ends of the lever arms 220. The grasping regions 223 are configured to be easily grasped by a user of the self-centering vial clamp 100. The grasping regions 223 can comprise cut-out or shaped regions that assist a user in grasping the two or more lever arms 220. The grasping regions 223 can comprise textured regions that assist a user in grasping the two or more lever arms 220. The grasping regions 223 can be over-molded with a pliable or resilient material in order to increase friction.

The lever arms 220 are configured to be moved by a user in order to operate the self-centering vial clamp 100. Each lever arm 220 is coupled to a corresponding clamp jaw 211 and is configured to move the corresponding clamp jaw 211 in a reciprocating manner Specifically, the combined clamp jaws 211 and lever arms 220 may be biased to keep the clamp jaws 211 in substantially closed or centered positions, in the absence of a user manipulating the lever arms 220. This substantially closed or centered position can place a predetermined clamping force on a vial present in the self-centering vial clamp 100.

Conversely, when a user squeezes together the extending ends of the lever arms 220, the lever arms 220 translate the user's applied force into a sliding force that is opposed to the normally-closed biasing force, retracting the clamp jaws 211 and releasing the vial.

A user operates the lever arms 220 to retract the clamp jaws 211. After a vial is placed between the clamp jaws 211 (but not necessary centered in the vial aperture 110), then the user can release the lever arms 220. However, it should be understood that the user does not have to carefully and accurately position the vial. The vial does not have to be centered in the vial aperture 110 and does not have to be centered between the clamp jaws 211. The vial merely has to be positioned so as to be acted on by the clamp jaws 211. The clamp jaws 211 are biased to autonomously move into contact with the vial when the lever arms 220 are released, clamping to the vial and holding the vial in position. The movement of the clamp jaws 211 will operate to center the vial with respect to the vial aperture 110. The shape of the vial contact faces 213 may assist in centering the vial.

The clamp jaws 211 are configured to place the predetermined clamping force on a vial. The predetermined clamping force in some embodiments may be placed on the vial no matter the size of the vial. However, the clamping force in some embodiments may vary over a predetermined clamping force range, as previously discussed. Advantageously, the clamping force may be designed to increase when the clamp jaws 211 are farther apart, as larger and heavier vials may need increased clamping force for adequate support. Further, the clamp jaws 211 move the vial substantially to the center of the vial aperture 110. This self-centering is done without any effort or attention by the user.

Similarly, the release procedure is simple and straightforward. It may be possible to merely pull the vial up and out of the self-centering vial clamp 100, depending on the vial and the magnitude of the predetermined clamping force. Alternatively, the user may again squeeze the lever arms 220 together, releasing the clamping force on the vial, and can then easily remove the vial.

The self-centering vial clamp 100 can further include one or more fastener apertures 107 that receive corresponding fasteners 108. The fasteners 108 can comprise any type of suitable fastener. As a result, the self-centering vial clamp 100 can be affixed (or removably affixed) to another structure. For example, the self-centering vial clamp 100 can be affixed to any manner of measurement instrument, including electronic and/or automated measurement instruments. The self-centering vial clamp 100 advantageously can make manual vial handling operations easier and faster to perform. In addition, the self-centering vial clamp 100 will reduce damage or breakage of vials by automated processing equipment, as the vials will be quickly, easily, and automatically centered.

Figure 2:
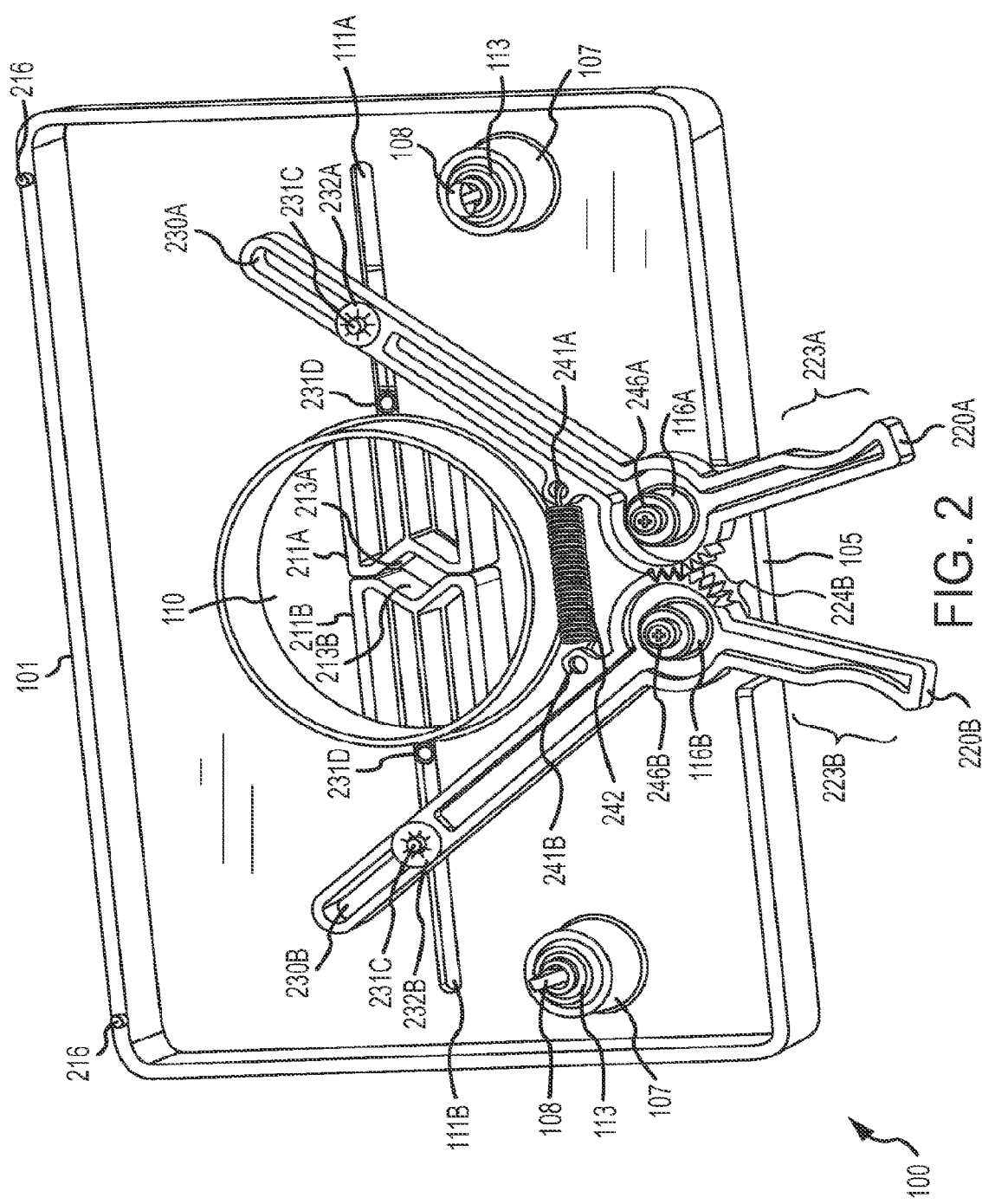
FIG. 2 shows an underside of the self-centering vial clamp according to the invention.

FIG. 2 shows an underside of the self-centering vial clamp 100 according to the invention. This figure shows further features of the clamp components. This figure shows additional detail of how the components interact to make the clamp function.

The clamp body 101 includes a lever gap 105. The ends of the lever arms 220 in the embodiment shown extend through the lever gap 105 and extend from the clamp body 101. Therefore, in this embodiment, a major portion of the lever arms 220 are not visible or exposed.

The clamp body 101 further includes one or more alignment projections 216. The one or more alignment projections 216 extend from the clamp body 101 and are configured to engage corresponding bores or features in another structure. The one or more alignment projections 216 assist in retaining the self-centering vial clamp 100 to this other structure. Further, the one or more alignment projections 216 are configured to cooperate with and assist the one or more fasteners 108 in affixing the self-centering vial clamp 100 to the other structure.

The clamp body 101 includes the fastener apertures 107 that include bores for receiving the fasteners 108. The fastener apertures 107 in some embodiments can comprise stand-offs, as shown. Retainers 113 can fit to the fasteners 108 and retain the fasteners 108 in the fastener apertures 107. The retainers 113 can comprise any suitable fasteners. The retainers 113 can removably or permanently affix to the fasteners 108. Ejector springs 109 can be included to automatically retract the fasteners 108 when the fasteners 108 are rotated or otherwise manipulated to disengage from the fastener apertures 107 (see FIG. 4 and the accompanying discussion).

The clamp jaws 211 further include one or more jaw projections 231. In the embodiment shown, the clamp jaws 211 include a first jaw projection 231C and second jaw projection 231D. The first jaw projection 231C and the second jaw projection 231D are configured to fit into the jaw slots 211, wherein the first jaw projection 231C and the second jaw projection 231D constrain the clamp jaws 211 to move substantially linearly and reciprocally over a predetermined range of motion.

The first jaw projection 231C and the second jaw projection 231D can be of any predetermined size and shape. The first jaw projection 231C and the second jaw projection 231D may be substantially cylindrical in some embodiments. Alternatively, the two projections can be replaced by more than two projections or may be replaced by a single projection of a non-cylindrical shape that prevents rotation of the clamp jaw 211.

The first jaw projection 231C is configured to receive a jaw projection fastener 232. The jaw projection fastener 232 can removably or permanently attach to the end of the first jaw projection 231C. The jaw projection fastener 232 can comprise any suitable fastener.

The lever arms 220 further include lever slots 230. The lever slots 230 receive the first jaw projections 231C of the clamp jaws 211 in some embodiments. The first jaw projections 232 can slide in the lever slots 230. Consequently, the lever slots 230 translate a rotational movement of the lever arms 220 into a linear, reciprocating movement. Rotational movement of the lever arms 220 due to manipulation by a user therefore forces the clamp jaws to move toward or away from the center of the vial aperture 110.

The lever arms 220 further include interacting lever gears 224. The lever gears 224 comprise an arc of gear teeth, wherein the first lever gear 224A of the first lever arm 220A meshes with the second lever gear 224B of the second lever arm 220B. Consequently, rotation of the first lever arm 220A will induce rotation of the second lever arm 220B, and vice versa. In this manner, a force on (and movement of) a single lever arm 220 will cause movement of both clamp jaws 211A and 211B. The lever gears 224 constrain the two or more lever arms 220 and the two or more clamp jaws 211 to move substantially in unison.

The lever arms 220 further include biasing device apertures 241. The biasing device apertures 241 are configured to receive at least one biasing device 242. The at least one biasing device 242 in some embodiments connects between the first and second lever arms 220A and 220B. The at least one biasing device 242 in some embodiments pulls the two lever arms 220 together. The at least one biasing device 242 therefore can provide the predetermined clamping force on the two or more clamp jaws 211. The at least one biasing device 242 is configured to urge the two or more clamp jaws 211 toward a normally-closed central position in relation to the vial aperture, i.e., the closed position of FIGS. 1 and 2, for example.

Alternatively, the at least one biasing device 242 can be connected between the two or more clamp jaws 211. In some embodiments, a biasing device 242 connected between the clamp jaws 211 could attach to a jaw projection 231. In addition, such a biasing device 242 could affix to the jaw projection 231 and replace or make unnecessary the jaw projection fastener 232, for example.

In the embodiment shown, the at least one biasing device 242 comprises a coil spring. However, it should be understood that the at least one biasing device 242 can comprise any suitable biasing device, including coil or leaf shaped biasing devices, for example. Further, the at least one biasing device 242 does not have to extend between two or more movable components and can be positioned between the clamp body 101 and a moveable component, for example, or can extend between three or more movable components. In addition, where the self-centering vial clamp 100 includes more than two lever arms 220 or more than two clamp jaws 211, then more than one biasing device 242 may be required.

The lever arms 220 further include pivot apertures 229 (see FIG. 4) that receive lever arm fasteners 246. The lever arm fasteners 246 hold the lever arms 220 to the clamp body 101, while allowing the lever arms 220 to rotate. The clamp body 101 can include stand-offs 116 that include bores (not shown) for receiving the lever arm fasteners 246. The lever arms 220 fit over the stand-offs 116, with the lever arm fasteners 246 engaging the bores.

Figure 3:
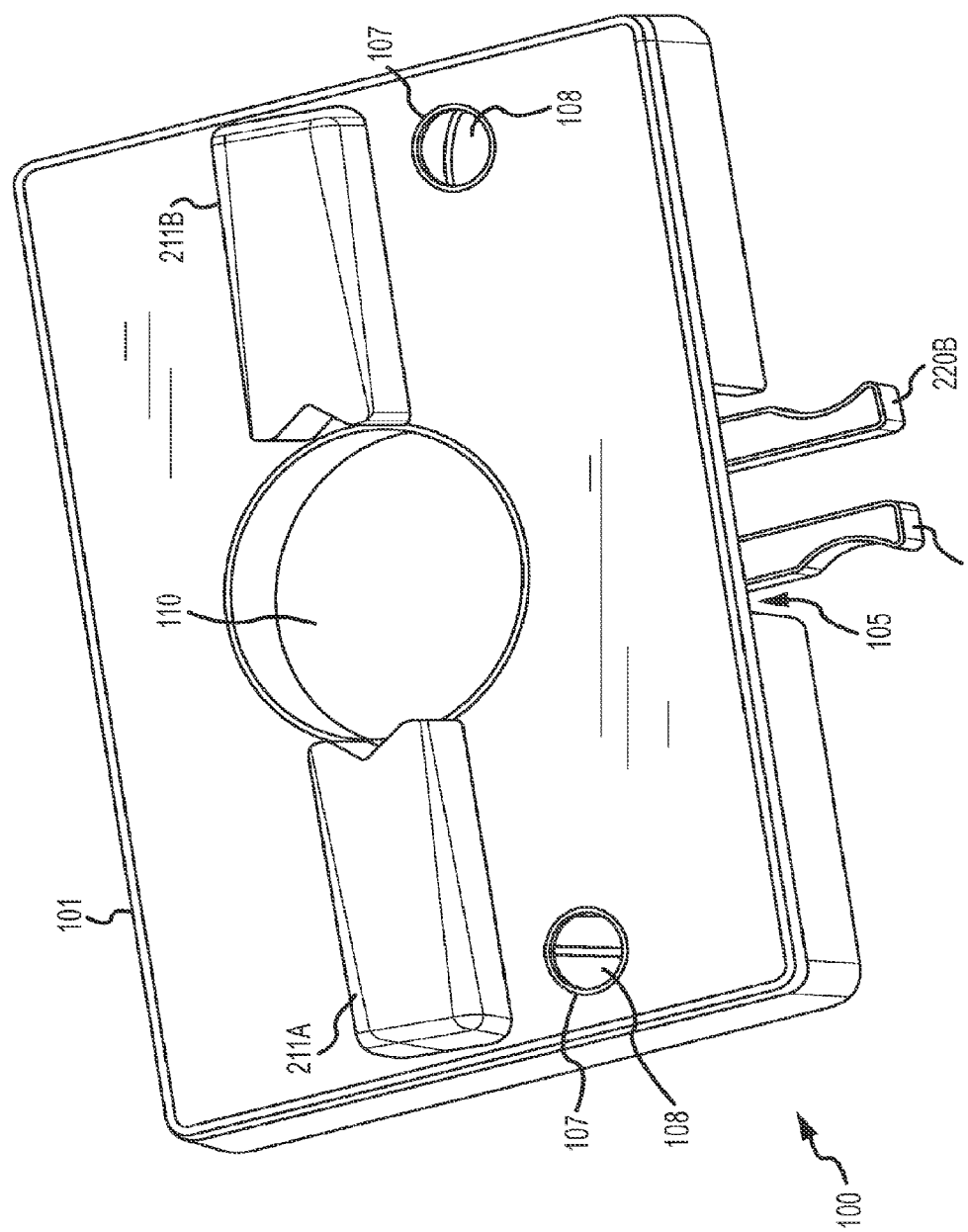
FIG. 3 shows the self-centering vial clamp in an open position, with the clamp jaws fully refracted.

FIG. 3 shows the self-centering vial clamp 100 in an open position, with the clamp jaws 211 fully retracted. This figure illustrates that the self-centering vial clamp 100 can receive a vial that is as large as the vial aperture size. It can be seen that the ends of the two lever arms 220 have been substantially squeezed together. It should be understood that in some embodiments, the clamp jaws 211 will spring back to the center of the vial aperture 110 in the absence of any continuing force(s) on the lever arms 220, i.e., the clamp jaws 211 will move back to the closed position immediately upon their release.

Figure 4:
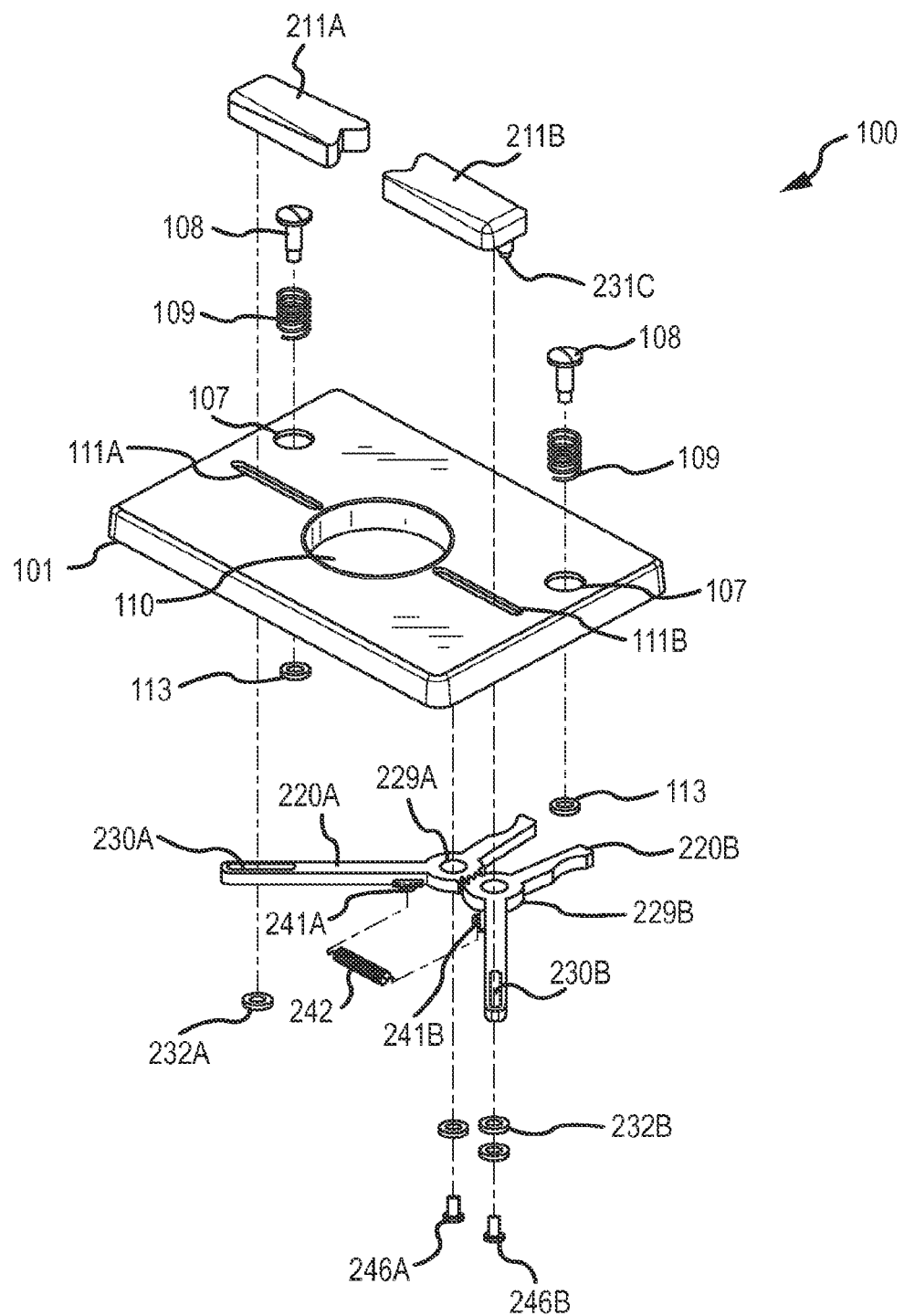
FIG. 4 is an exploded view of the self-centering vial clamp.

FIG. 4 is an exploded view of the self-centering vial clamp 100. This view shows the fasteners 108 being assembled into the fastener apertures 107 in the clamp body 101. The fasteners 108 can include corresponding retainers 113 and ejector springs 109. The retainer 113 can retain the fastener 108 in the fastener aperture 107, while the ejector spring 109 can urge the fastener 108 toward a partially retracted fastener position. Consequently, when the fastener 108 is manipulated to disengage from the clamp body 101, the ejector spring 109 will urge the fastener 108 away from the fastener aperture 107.

Figure 5:
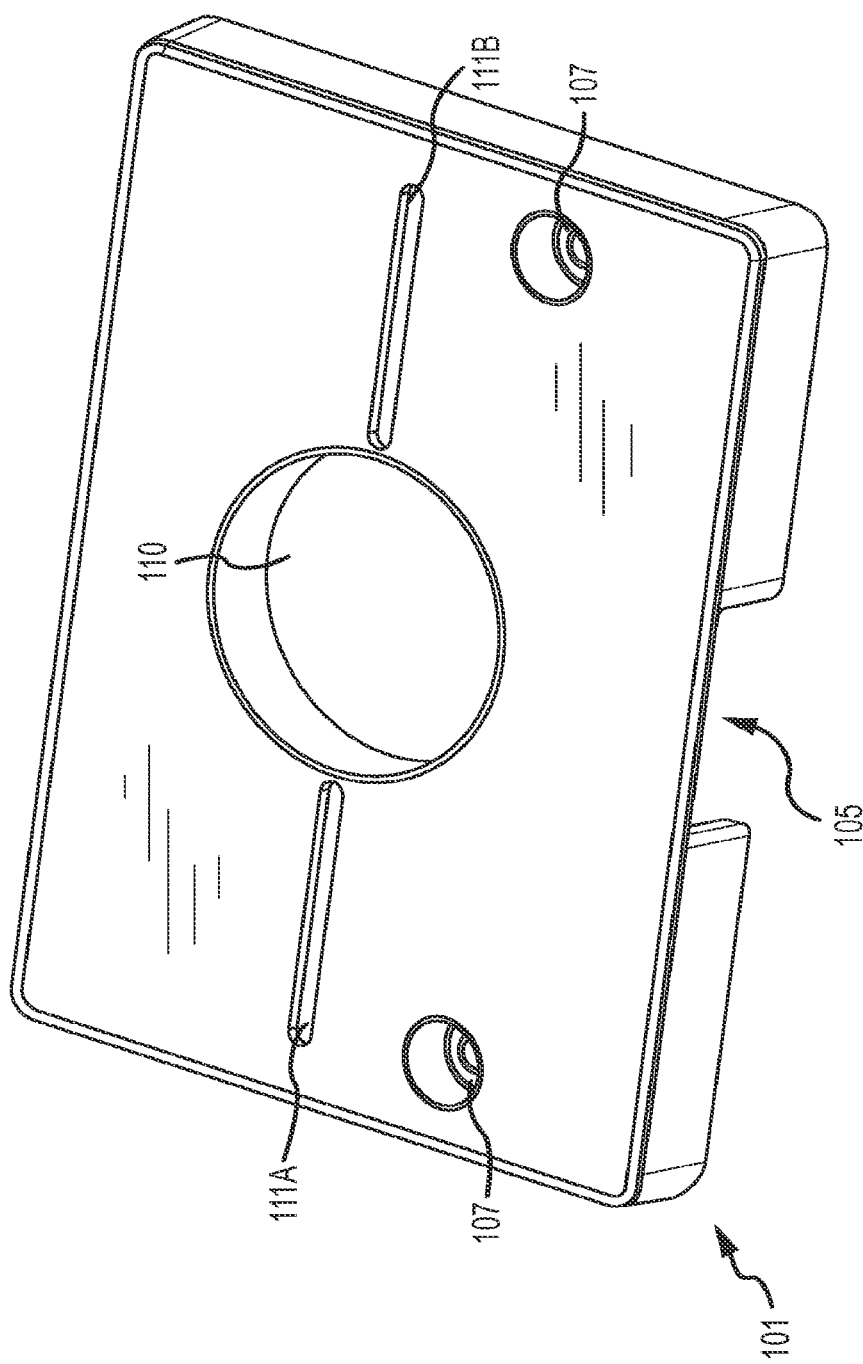
FIG. 5 shows a clamp body according to the invention.

FIG. 5 shows the clamp body 101 according to the invention. This figure shows the fastener apertures 107 and the lever gap 105. The fastener apertures 107 in this embodiment comprise recessed wells that receive a portion of the fasteners 108.

Figure 6:
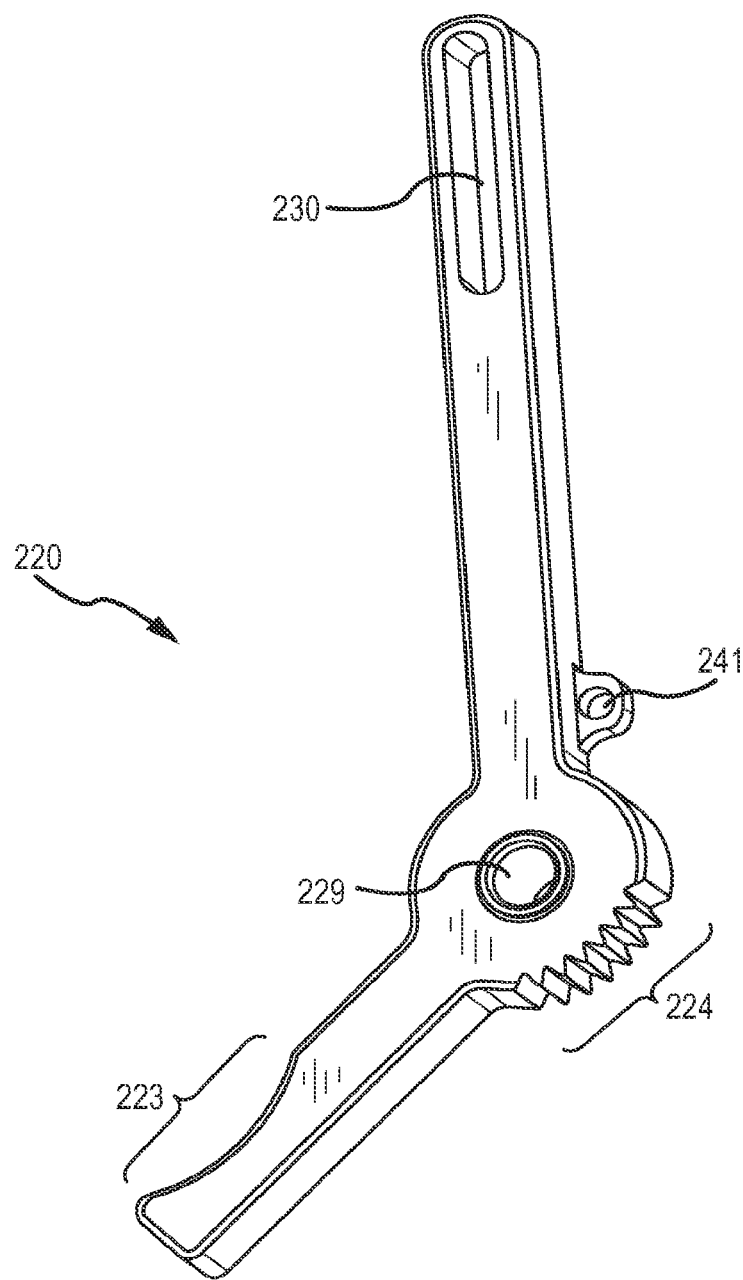
FIG. 6 shows a lever arm according to the invention.

FIG. 6 shows the lever arm 220 according to the invention. The figure shows the pivot aperture 229 for receiving the lever arm fastener 246.

Figure 7:
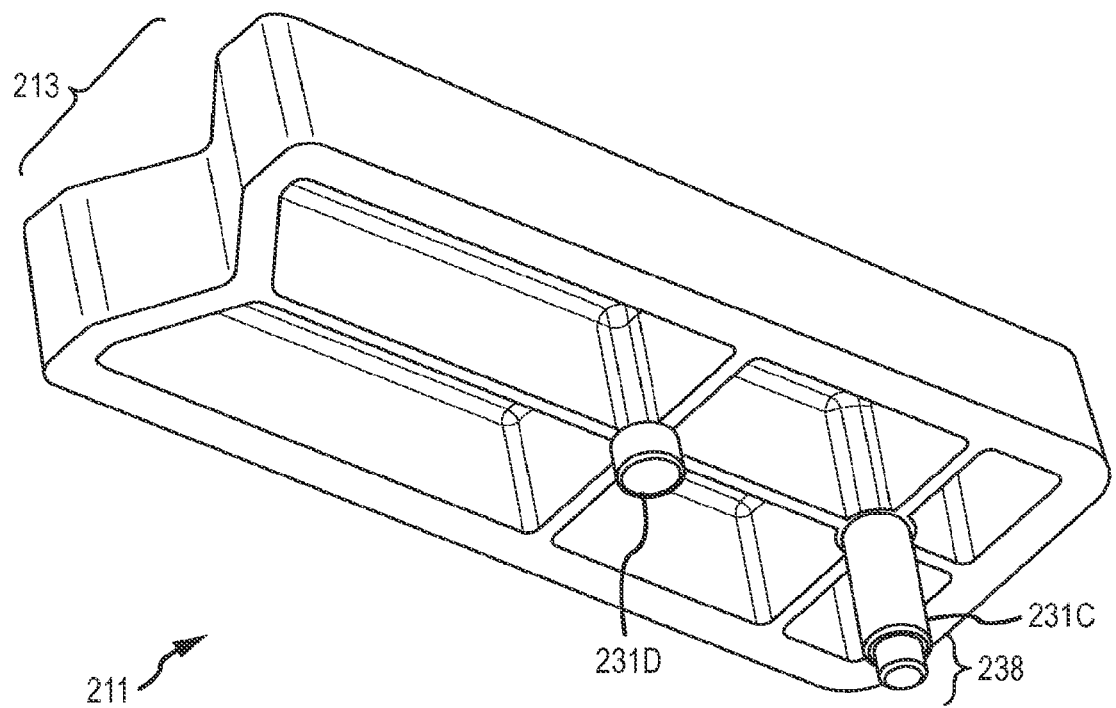
FIG. 7 shows a clamp jaw according to the invention.

FIG. 7 shows the clamp jaw 211 according to the invention. The clamp jaw 211 in some embodiments includes the first jaw projection 231C and the second jaw projection 231D. The first and second jaw projections 231C and 231D may be configured to fit to a jaw slot 111 of the clamp body 101.

It can be seen from the figure that the first jaw projection 231C can include a small end portion 238. The small end portion 238 can be configured to receive and hold the jaw projection fastener 232, with the jaw projection fastener 232 holding the lever slot 230 of the lever arm 220 over the first jaw projection 231C.

The invention claimed is:

1. A method for aligning a vial to an instrument, the method comprising the steps of:
   (i) obtaining a vial clamp having a clamp body, wherein the clamp body comprises:
      a first clamp jaw and a first jaw guide slot, wherein the first clamp jaw is constrained by the first jaw guide slot;
      a second clamp jaw and a second jaw guide slot, wherein the second clamp jaw is constrained by the second jaw guide slot;
      an alignment projection extending from the clamp body configured to engage the instrument; and
      a lever disposed on the clamp body and the first clamp jaw via the first jaw guide slot, wherein the lever includes lever gears that constrain the first and second clamp jaw;
   (ii) obtaining the vial, wherein the vial is configured to contain material;
   (iii) manually retracting the first and second clamp jaws by applying a force onto the lever;
   (iv) manually placing the vial between the clamp jaws; and
   (v) moving the first and second clamp jaws towards one another to secure the vial, the first and second clamp jaws being constrained by the lever gears to move substantially in unison toward the vial until the vial contacts the first and second clamp jaws, wherein, when the vial contacts the first and second clamp jaws, the vial is aligned to the instrument such that the instrument can access the material.

2. The method of claim 1, wherein the step of moving includes removing the force applied onto the lever.

3. The method of claim 1, wherein the step of moving includes applying a predetermined clamping force.

4. The method of claim 1, wherein the first and second clamp jaws are moved substantially in unison toward the vial by sliding substantially in unison toward the vial.

5. The method of claim 1, wherein the material contained in the vial is liquid, and the vial is open-ended.

6. A method for aligning a vial to an instrument, the method comprising the steps of:
(i) obtaining a vial clamp having a clamp body, wherein the clamp body comprises:
a first clamp jaw and a first jaw guide slot, wherein the first clamp jaw is constrained by the first jaw guide slot;
a second clamp jaw and a second jaw guide slot, wherein the second clamp jaw is constrained by the second jaw guide slot;
an alignment projection extending from the clamp body configured to assist in retaining the vial clamp to the instrument; and
lever gears that constrain the first and second clamp jaw;
(ii) obtaining the vial, wherein the vial is configured to contain material;
(iii) retracting the first and second clamp jaws, wherein the retracting includes applying a force onto at least one lever, the at least one lever being operatively coupled to the first clamp jaw;
(iv) placing the vial between the first and second clamp jaws; and
(v) moving the first and second clamp jaws toward the vial until the vial contacts the first and second clamp jaws, wherein the at least two clamp jaws are constrained by the lever gears to move substantially in unison, wherein, when the vial contacts the first and second clamp jaws, the vial is aligned to the instrument such that the instrument can access the material contained in the vial.

7. The method of claim 6, wherein the step of retracting is performed manually.

8. The method of claim 6, wherein the step of moving includes removing the force applied onto the lever.

* * * * *